United States Patent [19]

Funk et al.

[11] Patent Number: 4,474,458
[45] Date of Patent: Oct. 2, 1984

[54] PHOTOGRAPHIC FILM PRINTER

[75] Inventors: Donald E. Funk, Masontown, W. Va.; Charles H. Chae, Greenfield; Raymond A. LoTurco, Columbus, both of Ind.

[73] Assignee: Allied Industries, Inc., Pittsburgh, Pa.

[21] Appl. No.: 420,811

[22] Filed: Sep. 21, 1982

[51] Int. Cl.³ ............................................. G03B 13/28
[52] U.S. Cl. .................................................... 355/45
[58] Field of Search ............... 355/45, 43, 32, 29, 355/28, 18, 46, 67, 68; 354/90; 353/116

[56] References Cited

U.S. PATENT DOCUMENTS

| | | | |
|---|---|---|---|
| 3,563,150 | 2/1971 | Klemann | 355/45 X |
| 3,718,807 | 2/1973 | Bracken et al. | 235/92 PD |
| 3,765,759 | 10/1973 | Yamada | 355/45 |
| 3,779,641 | 12/1973 | Hauck | 355/29 |
| 3,875,861 | 4/1975 | Stackig | 101/226 |
| 3,899,248 | 8/1975 | Tiger | 355/45 X |
| 3,947,109 | 3/1976 | Kinder et al. | 355/29 |
| 4,035,074 | 7/1977 | Flor | 355/27 |
| 4,059,355 | 11/1977 | Fritsch | 355/45 X |
| 4,073,588 | 2/1978 | Zangenfeind et al. | 355/41 |
| 4,076,411 | 2/1978 | Crayton et al. | 355/28 |
| 4,080,067 | 3/1978 | Massengeil | 355/67 |
| 4,088,404 | 5/1978 | Zahn et al. | 355/29 |
| 4,120,581 | 10/1978 | Takahashi et al. | 355/38 |
| 4,126,391 | 11/1978 | Nishimoto | 355/27 |
| 4,135,810 | 1/1979 | Walter | 355/29 |
| 4,140,390 | 2/1979 | Schultheis et al. | 355/29 |
| 4,157,221 | 6/1979 | Raven | 355/29 |
| 4,176,944 | 12/1979 | Payrhammer | 355/18 |
| 4,185,912 | 1/1980 | Schwartz | 355/28 |
| 4,192,594 | 3/1980 | Oidaira et al. | 354/90 |
| 4,204,754 | 5/1980 | Asanuma et al. | 353/116 |
| 4,214,834 | 7/1980 | Findeis et al. | 355/46 |
| 4,227,804 | 10/1980 | Pramstraller | 355/67 |
| 4,232,962 | 11/1980 | Sauer | 355/46 |
| 4,236,815 | 12/1980 | Anderson | 355/29 |
| 4,236,817 | 12/1980 | Hofstetter | 355/68 |

Primary Examiner—Richard A. Wintercorn
Attorney, Agent, or Firm—Buell, Blenko, Ziesenheim & Beck

[57] ABSTRACT

A photographic film printer including a housing, a lamphouse, negative handling portions, filters, paper handling portions and a reflex viewing mirror which permits viewing of the negatives while they are positioned at the printing station. In addition, the printer provides a linkage which permits a negative pressure plate to provide firm engagement and retention of a negative strip. A splicing station for joining successive negative strips is provided. Paper handling and cutting features are also provided. Shutter operating elements are included. Systems for resisting undesired entry of light into the printer interior are provided. Remote, manual advance of the negative strip is provided.

31 Claims, 13 Drawing Figures

PHOTOGRAPHIC FILM PRINTER

BACKGROUND OF THE INVENTION

1. Field of the Invention

The present invention relates to a photographic film printer and, more specifically to a new and improved automated photographic film printer.

2. Description of the Prior Art

Various systems have been known for creating photographic prints by exposing a negative through a suitable light source so as to create a desired image on photographic print paper. It has also been known to provide automated means for effecting such processing.

In spite of the fact that the state of the art is, in some respects, advanced, there remains a need for improving speed and efficiency of operation as well as maintaining of desired quality standards.

SUMMARY OF THE INVENTION

The present invention has provided a solution to the above described needs.

In the present invention the printer provides unique reflex mirror means for viewing of the negatives in print position. The viewer is so constructed as to permit the operator to employ the same without burdensome movement or difficulty viewing the negative. In addition, the mirror means is adapted to have at least a portion thereof movable so as to seal off the viewing window during printing. The invention also provides unique negative retaining, splicing and handling means.

Improved paper handling means are provided as are improved additional means for resisting undesired entry of light.

It is an object of the present invention to provide a photographic film printer which is adapted to be automated and effective in functioning as well as economical to manufacture and employ and may readily be made in such size as to be a tabletop unit.

It is another object of the present invention to provide such a photographic printer wherein improved efficiency is achieved, in part, through a unique viewing system while not interfering with the printing operation.

It is yet another object of the present invention to provide improved means for handling the print paper, the negatives to be printed as well as the photographic masks which are to be employed.

It is yet another object of the invention to provide means for permitting relative adjustment between components of the system so as to facilitate more efficient operation.

These and other objects of the invention will be fully understood from the following description of the invention and reference to the illustrations appended hereto.

DESCRIPTION OF THE PREFERRED EMBODIMENTS

Figure 1:
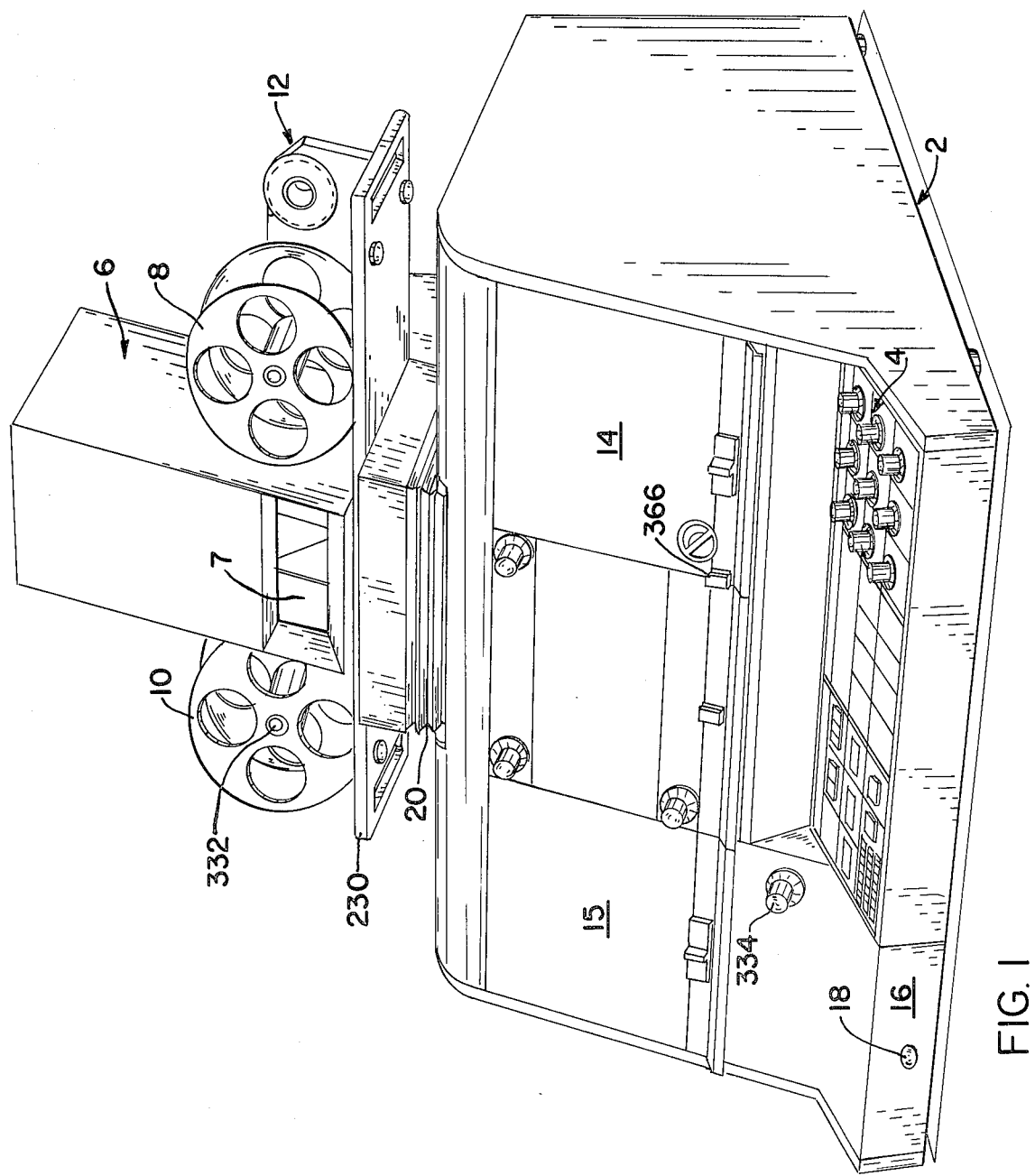
FIG. 1 is a perspective view showing the exterior housing of one form of the present invention.

Referring now more specifically to FIG. 1 there is shown the exterior housing of a form of photographic film printer of the present invention. The printer has a housing 2 and, in the form shown, in the lower front portion has a control panel 4. A lamphouse 6 is disposed generally centrally in the upper portion and is provided with a viewing window 7 which will be described in detail hereinafter. On opposed sides of the lamphouse 6 are, respectively, a reel 8 which is adapted to hold a negative strip from which prints are to be made and a reel 10 which is adapted to serve as a take-up reel for the negatives which pass through the printing zone. A splicing station 12 which permits the edge of one negative strip to be joined to the adjacent negative strip is provided adjacent to reel 8 on the exterior of the housing 2. Within portions 14, 15 of the housing respectively, are disposed a supply reel of photographic print paper and a take-up reel for exposed portions of the paper. A drawer 16 which may be used to store masks employed in the printing process is provided with a knob 18 to facilitate opening and closing thereof.

Figure 2:
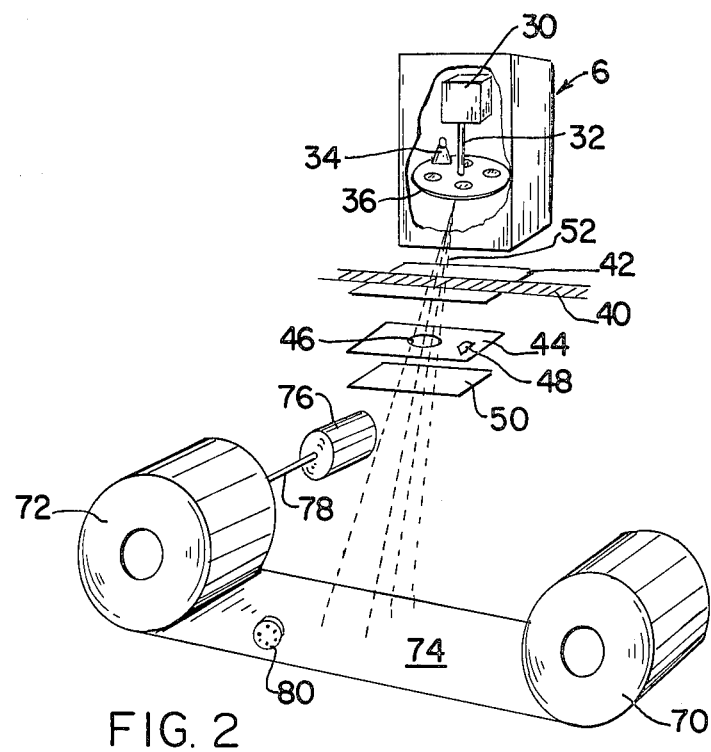
FIG. 2 is a schematic illustration of a portion of the printer of the present invention.

Referring now to FIG. 2, a schematic illustration of interior portions of the printer will now be considered. In the interior of the lamphouse is disposed a motor 30 which has a generally downwardly depending output shaft 32. A lamp 34 is fixedly secured in generally overlying relationship with respect to a printing station. A disc 36 provided with filters is fixedly secured to shaft 32 for reasons which will be described in detail hereinafter.

The negative strip 40 consisting of a number of negative images, is supported on the negative carrier plate 42 which plate has an opening to permit light to pass therethrough during printing. A lens plate 44 is in spaced underlying relationship with respect to the negative strip 40 and is provided with an opening for receipt of a lens (not shown) which will serve to focus the light which has passed through the negative onto the desired sector of the printing paper 74. A photocell 48 is positioned on the lens plate 44 and is adapted to monitor the intensity of light impinging upon the lens plate 44.

Still referring to FIG. 2, a supply reel 70 of photographic print paper cooperates with a take-up reel 72 so as to provide an exposed portion 74 on which the desired photographic image may be printed. The take-up reel 72 may be driven by a suitable motor 76 which is connected to the reel by output shaft 78. A counter 80 to monitor the extent of paper advance during a period of operation of motor 76 is preferably provided.

Figure 3:
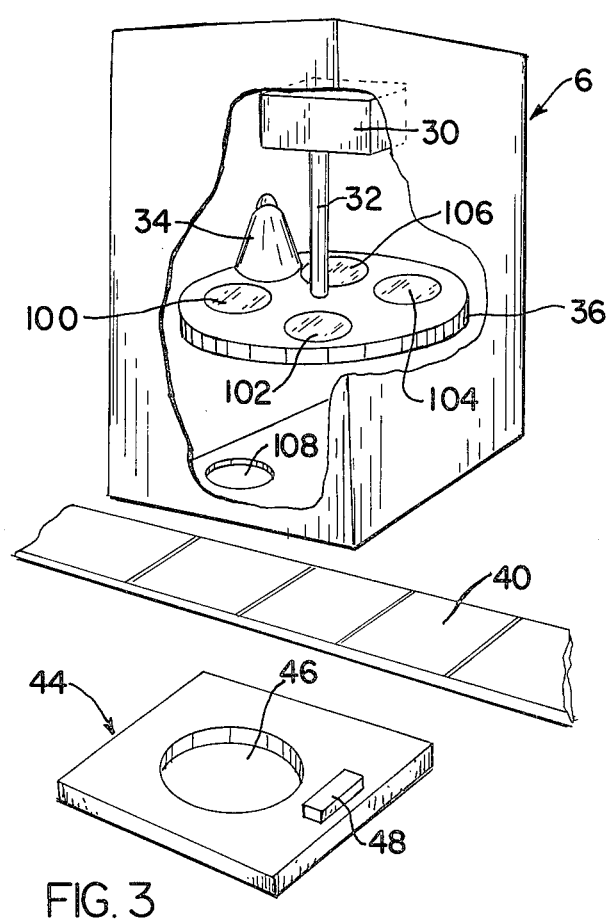
FIG. 3 is a schematic illustration showing a portion of the lamphouse and associated components of the printer of the present invention.

Referring to FIG. 3, there is shown a disc 36 which, in the form shown, has a series of filters 100, 102, 104, 106 and a further opening underlying lamp 34. The filters may be adapted for various colors and one plain opening to provide white light may be provided for when it is desired to process black and white film. It will be appreciated that by maintaining the lamp 34 in fixed position and rotating disc 36, the desired filtering effect on the light beam emerging from lamp 34 may be achieved. The beam will pass from the lamp 34 through one of the filtered openings in the disc and then through opening 108 in the lower portion of the lamphouse. The light will then pass through the predetermined negative, through the lens which will be provided in opening 46 and be focused on the desired sector of the underlying photographic print paper thereby effecting the desired printing exposure.

Figure 4:
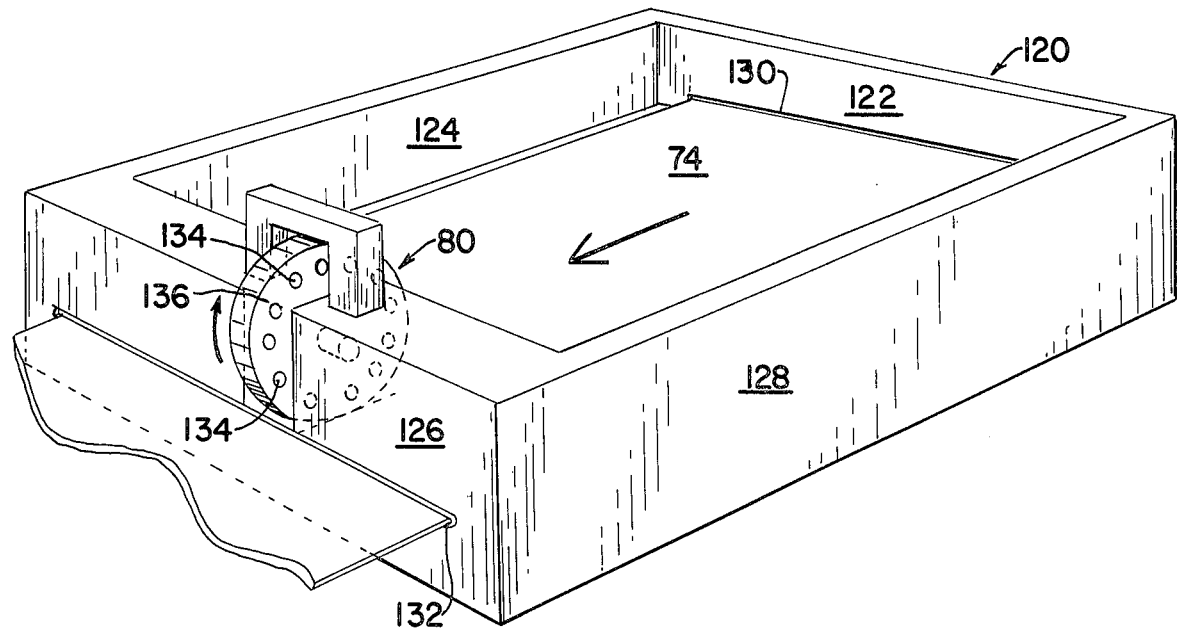
FIG. 4 is a partially schematic view of a paper carrier, guide and measuring device of the present invention.
Figure 5:
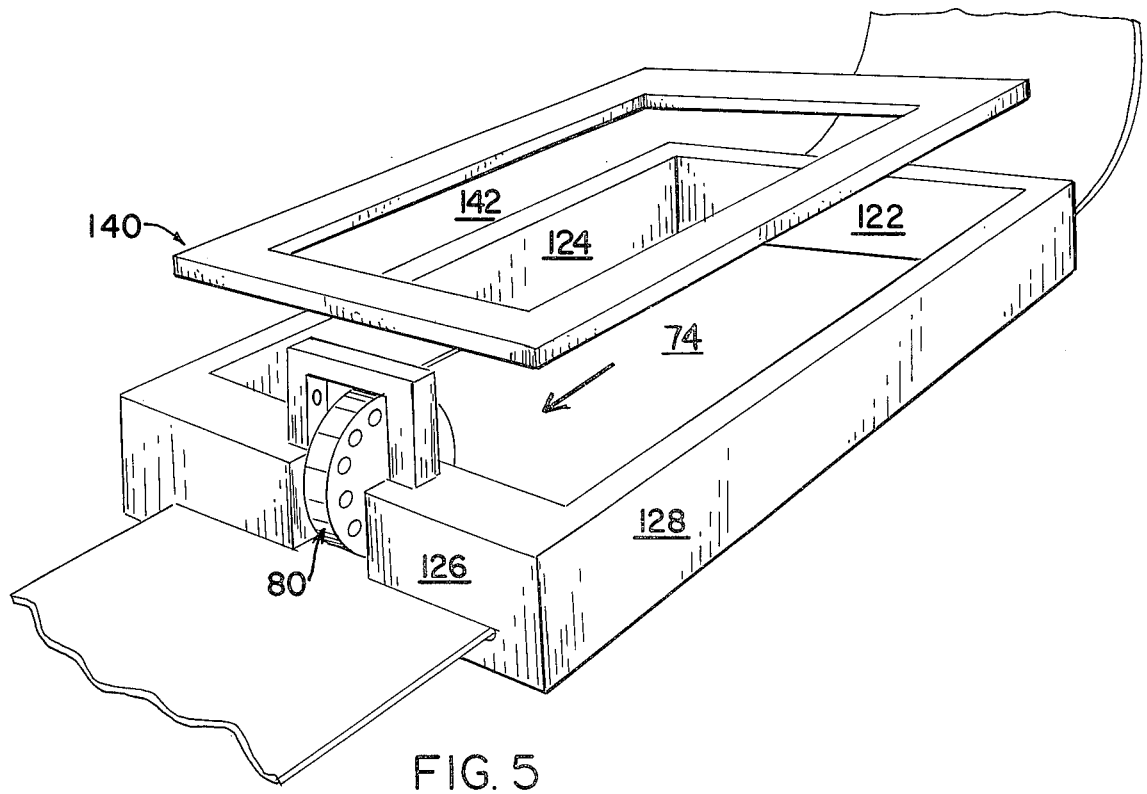
FIG. 5 is an illustration similar to FIG. 4, but showing an overlying photographic mask.

Referring now to FIGS. 4 and 5, further details of the photographic print paper handling system and associated masks will be considered. In these views the supply reel 70 (not shown) will be to the right hand portion of the drawing and the take-up reel 72 (not shown) will be to the left. The end walls 122, 126 are each provided with an elongated slot 130, 132 so as to permit free movement of the photographic paper in the direction indicated by the arrow while confining the same to the desired path of movement. In order to determine the amount of linear travel of the paper during an increment of operation of motor 76, wheel 80 is provided. The wheel is rotatably mounted in a gap in wall 126 by any suitable means. A plurality of openings 134 passing entirely through the wheel are provided. A suitable energy beam is adapted to be passed across the gap in wall 126 at the radial position where the openings exist. As a result, when the wheel rotates the beam will cyclically be permitted to pass through an opening 134 and then be blocked by an adjacent solid portion of wheel 136. By monitoring the number of pulses received or numbers of interruptions to the pulse by any suitable receiving means forming no part of the present invention per se, one may obtain a quantitative indication as to the number of linear units of paper which have traveled. In this fashion, one may have a servomechanism effect which permits precise control of the amount of advance of paper between successive exposures.

Referring to FIG. 5 there is shown a mask member 140 which is generally rectangular and has a generally rectangular opening 142. It is contemplated that a series of masks each having generally identical outer peripheral dimensions and different sized openings will be provided. Once a mask of the desired size opening is selected it will rest on top of the paper guide and thereby limit the amount of photographic print paper which will be exposed to the light originating in the lamphouse, passing through the negative and lens and being projected onto paper 74.

Figure 6:
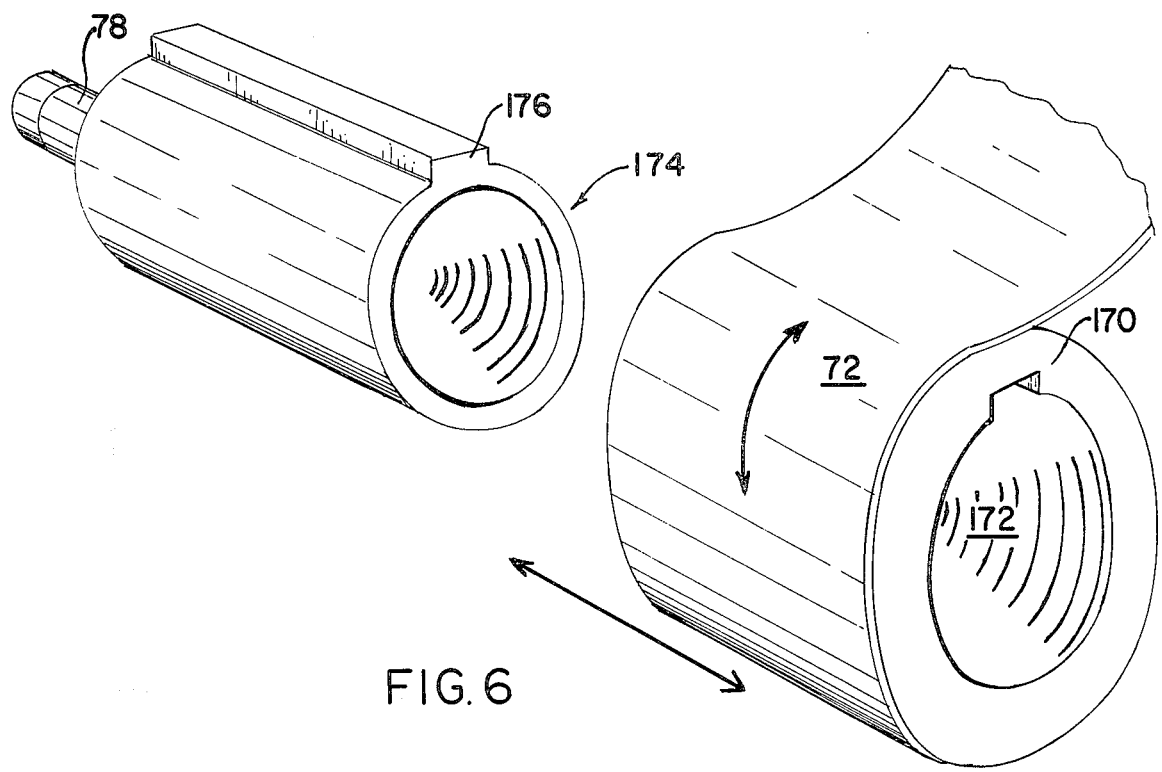
FIG. 6 is an exploded view showing a portion of the paper support and loading means.
Figure 7:
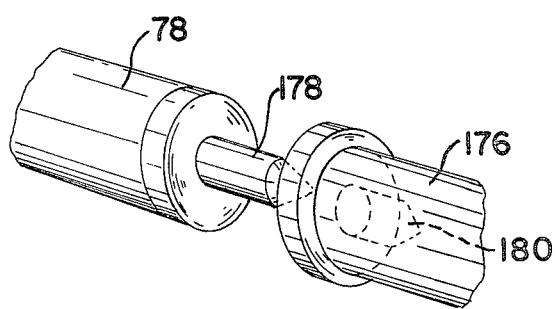
FIG. 7 is an exploded view showing a portion of the drive means for the photographic paper.

Referring now to FIGS. 6 and 7, preferred details of the photographic print paper handling will be considered. The take-up reel 72 preferably has a core member 170 provided with an elongated key slot 172 which receives the cannister drive spool 174 which is provided with an elongated key 176 which is adapted to be received within slot 172 to thereby permit the motor 76 through shaft 78 to drive the spool 72. FIG. 7 illustrates one means of providing a slip fit connection between the drive spool 176 and shaft 78 by means of a shaft projection 178 which is received within recess 180 of the spool 174.

Figure 8:
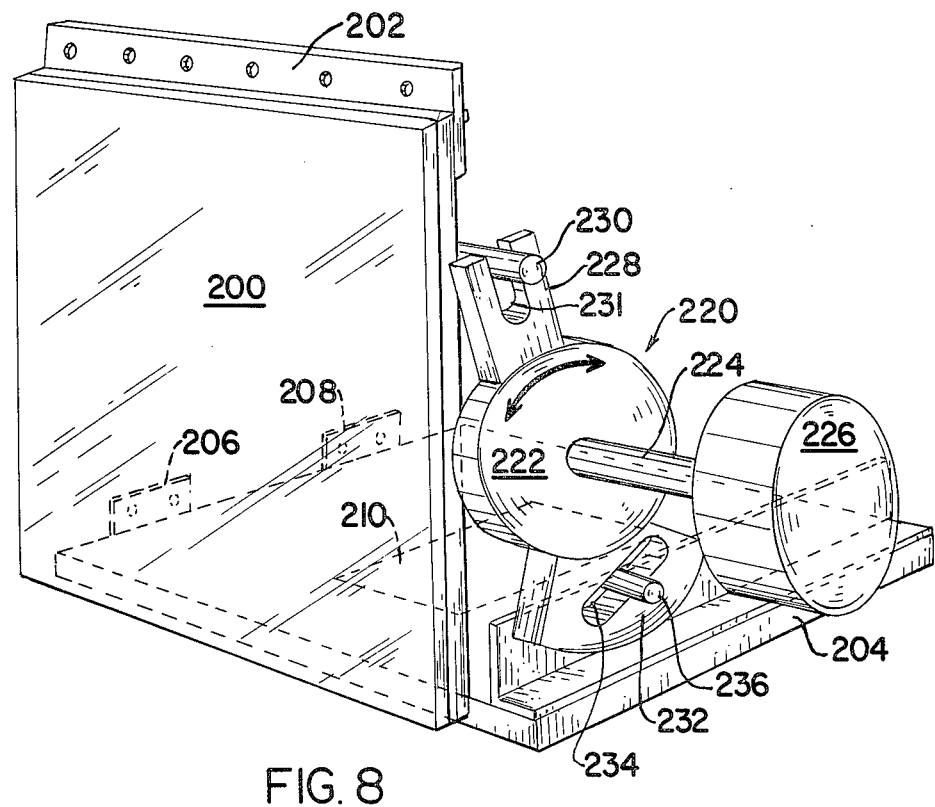
FIG. 8 is a detailed illustration of a portion of the linkage for the reflex viewing device.

Referring now to FIG. 8, a preferred form of reflex viewing member will be considered. In the position shown in FIG. 8, the reflex mirror 200, which is hingedly attached to the housing by hinge plate 202, is in closed position which has the mirror abutting and sealing off the window 7 (FIG. 1) thereby resisting undesired entry of light into the printer interior during the printing operation. Also shown in this view is the negative pressure plate 204 which cooperates with the negative carrier plate to provide clamping action on the negative strip so as to retain the particular frame of the negative in the exposure position. This plate 204 is pivotally secured to the housing by means of hinges 206, 208. The negative pressure plate 204 has an opening 210 which permits light eminating from the lamphouse to pass therethrough. It is contemplated that when the printer is in a printing mode not only will the mirror 200 resist entry of undesired light through window 7, but also the negative pressure plate 204 will exert a moderate force so as to clamp the negative strip in fixed position for exposure. When the printer is not in printing mode, the negative pressure plate 204 will be raised so as to permit free sliding movement of the negative strip. Also, the mirror 200 will be moved to a rearward position through pivoting movement generally about hinge plate 202 so as to cause it to assume a position generally rearwardly and rotated about 45 degrees from the position shown in FIG. 8. In this fashion, an operator looking in through the window will see through the reflex action of the mirror the negative which is positioned in the exposure position.

Referring still to FIG. 8, there is shown a preferred mechanism for effecting the above-described movement of mirror 200 and negative pressure plate 204. Linkage member 220 has a generally circular center portion 222 and is connected by shaft 224 to rotary solenoid 226 which when activated will establish rotation of shaft 224 in either clockwise or counterclockwise direction depending upon the manner in which it is energized. A first extension 228 of linkage 220 is fixedly secured to circular portion 222 and terminates in a bifurcated configuration which defines slot 231 in which pin 230, which is fixedly secured to mirror 200, may move. Similarly, extension 232 is fixedly secured to circular portion 222 and has a slot 234 in which pin 236, which is fixedly secured to negative pressure plate 204, moves. It will be appreciated that when the linkage 220 is rotated in counterclockwise direction, the mirror 200 is moved to the closed position shown in FIG. 8 an the negative pressure plate 204 is urged downwardly. When the linkage member 220 is rotated in a clockwise direction, the mirror 200 is pivoted generally about hinge plate 202 until it moves to the open position and the negative pressure plate is moved upwardly.

Figure 9:
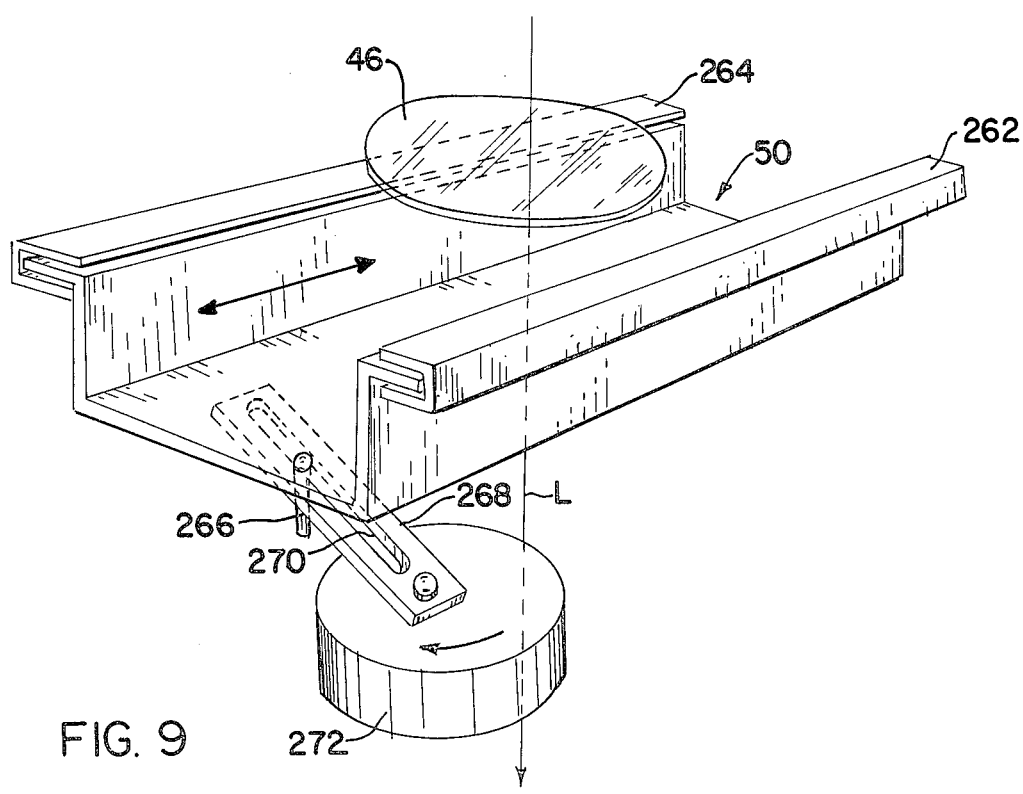
FIG. 9 is an illustration of the shutter and associated mechanism.

Referring now to FIG. 9 there is shown the shutter 50 which is adapted to be moved to one position where it blocks light passing through lens 46 from impinging upon the photographic print paper 74 and a second position where it is in non-interfering relationship such that exposure in printing may occur. In the form shown, the shutter 50 is of generally channel shape with a pair of outwardly projecting flanges. One flange is received within guide rail 262 and the other within guide rail 264. This restricts the shutter 50 to relative sliding movement along the path defined by the rails 262, 264. Fixedly secured to and projecting from the lower surface of the shutter is pin 266 which is received within slot 270 of link 268. Link 268 is pivotally secured to solenoid 272 which when energized will rotate in one of two rotary directions to thereby effect responsive movement of the shutter.

Figure 10:
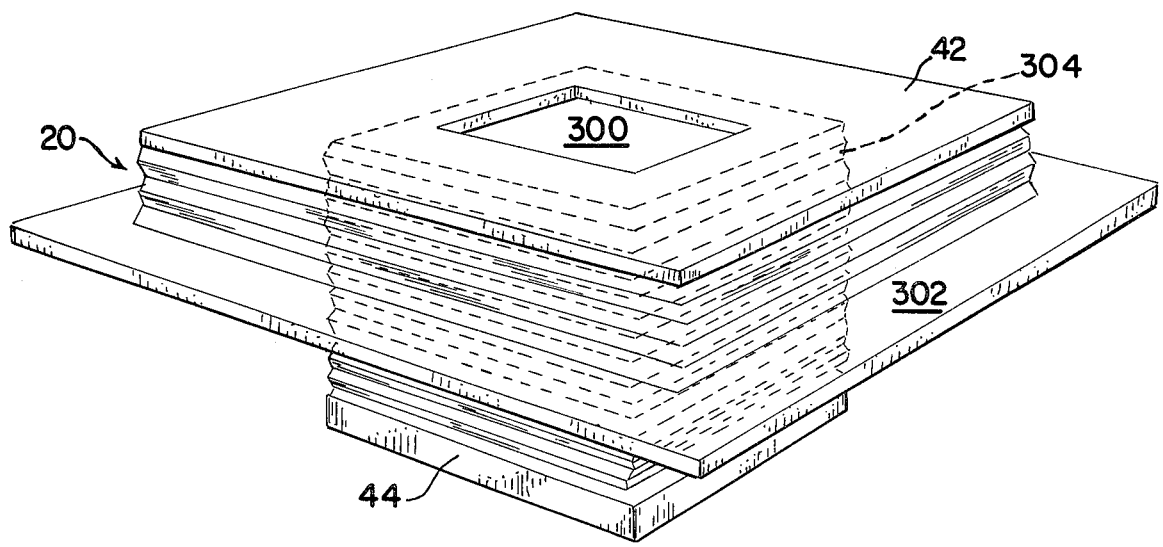
FIG. 10 is a schematic view of a form of light-tight enclosure employed with the present invention.

Referring now to FIG. 10, the negative carrier plate 42 is provided with an opening 300 through which light may pass on its way to the lens plate 44 and therethrough to the photographic print paper. In order to resist undesired entry of light which would interfere with the printing operation, a preferred approach in the present invention is to provide a bellows structure 20. The bellows 20 connects the exterior of negative carrier plate 42 with an opaque closure plate 302. In addition, an interior bellows 304 connects the interior opening 300 with the lens plate 44 and in the form shown is secured to the upper portion thereof adjacent the outer periphery.

Figure 11:
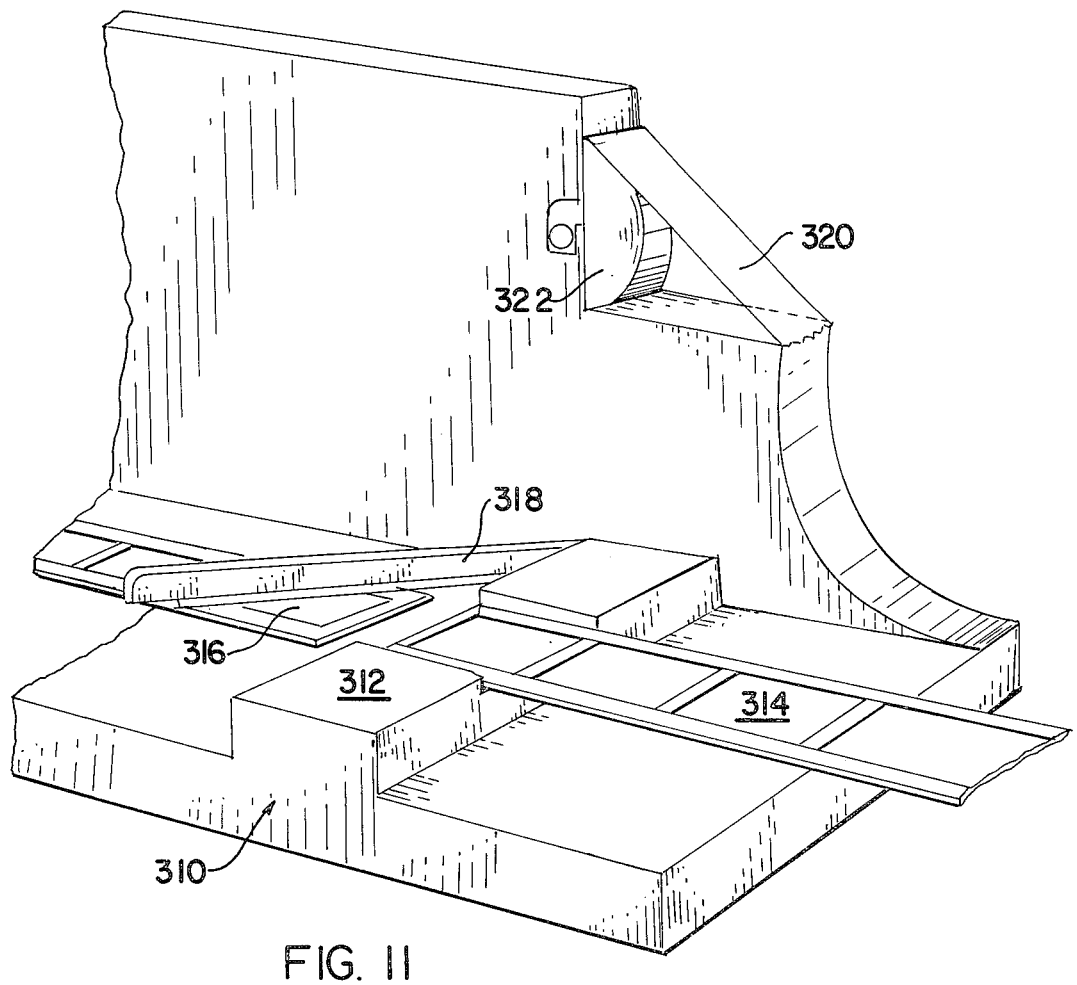
FIG. 11 is a schematic illustration of a negative splicing station of the present invention.

Referring now to FIG. 11 the splicing station 12 for the incoming negative strips will now be considered in greater detail. A film splicing platen 310 is provided with a film guide 312 and has a recess through which a negative strip 314 which is to be spliced to negative strip 316 may be laterally restrained while permitting sliding movement therethrough. A pivoted film cutting blade 318 may be employed to trim the edge of the negative strip. The strips are then placed in the abutting position and tape 320 is severed from tape roll 322 by tape cutter 324. The tape is then secured over the abutted edges.

Figure 12:
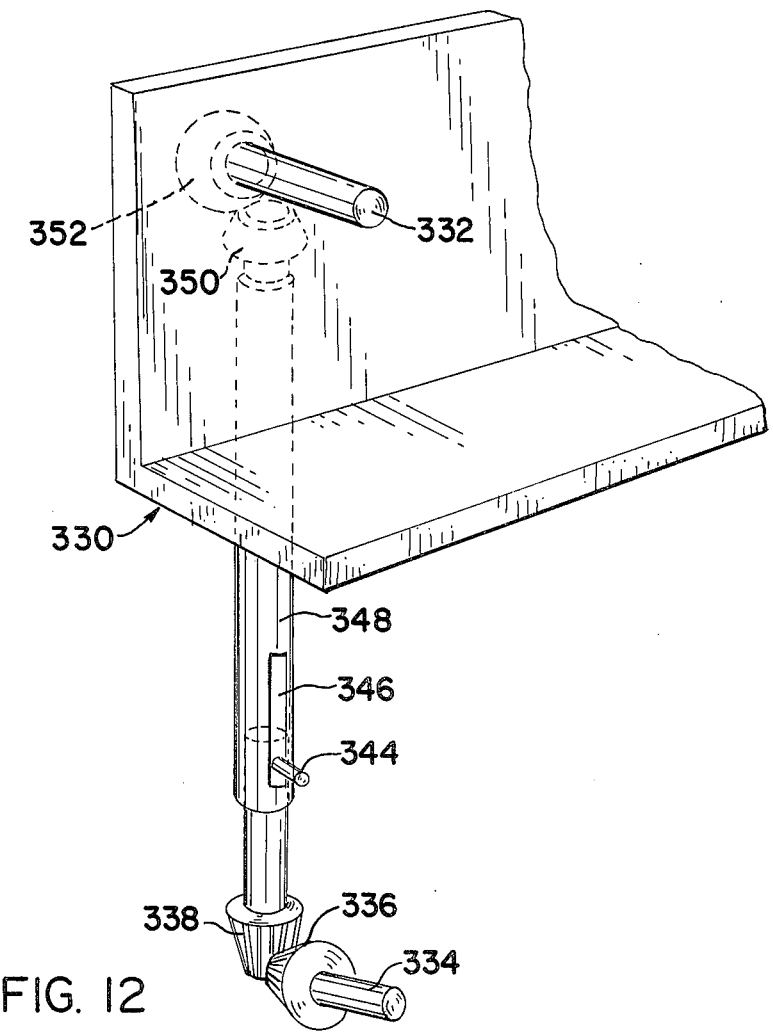
FIG. 12 illustrates a portion of the negative take-up reel drive of the present invention.

Referring now to FIGS. 1 and 12, means for rotating the negative take-up reel 10 will be considered. This means compensates for changes in relative position of the portion of the printer above the bellows and the portion below. Such positioning is desired in order to provide for proper focusing of lens 46 by adjusting the distance between lens 46 and negative film strip 40 so as to provide the proper image on the photographic print paper 74. Shelf 330 is generally L-shaped and rotatably supports spindle 332 on which reel 10 rotates. By rotating handle 334, bevel gear 336, which is engaged with bevel gear 338, causes rotation of shaft 340 and shaft pin 344. Pin 344 is received in slot 346 and effects rotation of tube 348 within which the generally axially oriented slot 346 is formed. This causes responsive rotation of bevel gear 350 which is meshed with bevel gear 352. Gear 352 is fixedly secured to spindle 332. As a result of this relationship, rotating of knob or handle 334 causes rotation of reel 10 which is fixedly secured to spindle 332 thereby advancing the negative. Slot 346 permits the mechanism to continue to function in spite of changes in relative elevation of shelf 330 with respect to lower portions of the housing.

Figure 13:
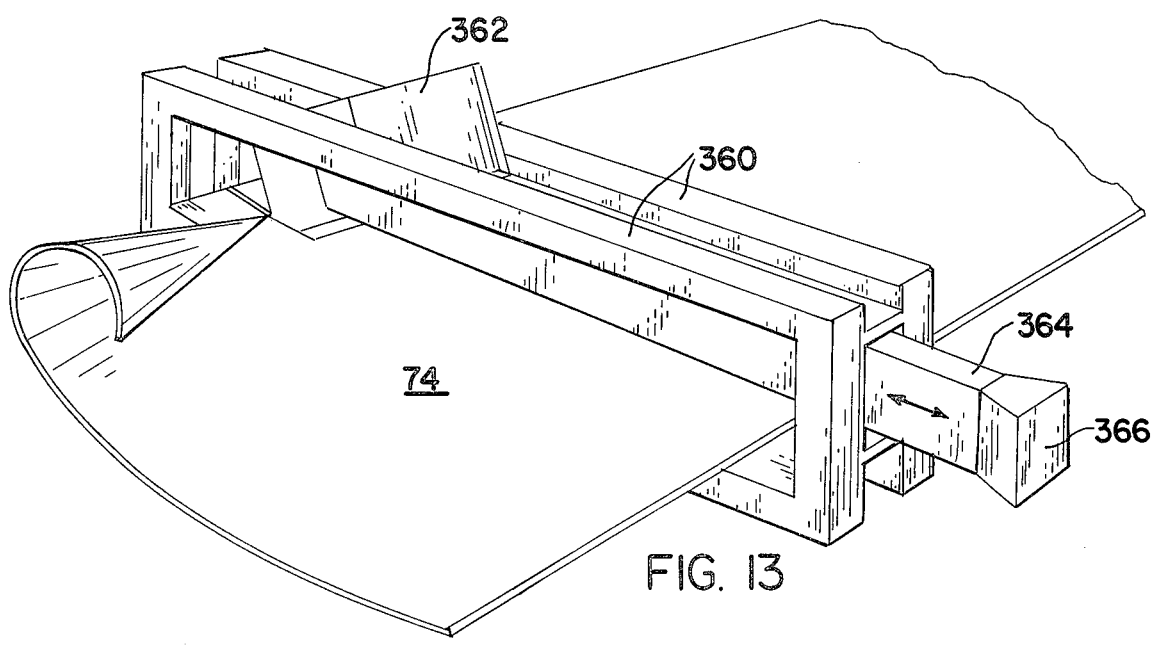
FIG. 13 illustrates schematically a portion of the paper cutting area.

Referring now to FIG. 13, details of the preferred means for effecting cutting of photographic print paper will now be considered. A cutting guideway 360 is positioned within the housing and defines a path of transverse movement for cutting tool 362 which has an elongated handle 364 terminating in a manually engageable knob 366. By engaging knob 366 and moving the cutting tool 362 generally outwardly, the paper is cut along the predetermined path. The cutter will generally be positioned upstream of the print station.

In operating the printer of this invention, a desired mask 140 is placed on the paper guide 120 after access is given by opening a suitable access panel. After effecting negative splicing at station 12, the negative strip is threaded through the housing and onto reel 10 with the shutter 50 in the closed position. The mirror 200 is moved to the viewing position. By rotation of knob 334, the negative which it is desired to print is aligned with opening 210 in negative pressure plate 204 and opening 300 in negative carrier plate 42. A light source (not shown) disposed generally underlying opening 300 illuminates the underside of the negative to facilitate viewing. After viewing, this light source is turned off. The reflex mirror 200 is then moved to the first position with the negative pressure plate clamping the negative in position. The lamphouse light source 36 is then turned on and the disc 36 positioned so as to place the desired filter within the light beam. The shutter 50 is moved out of light obstructing position for the period of time exposure is desired and then is returned. The negative strip and film print paper are then advanced and the cycle is repeated. When the last of a group of negatives has been printed the paper cutter is activated by pulling knob 366.

It will be appreciated, therefore, that the present invention has provided an improved photographic film printer with numerous advantageous features.

Words of relative position, such as "above", "below", "under", "upwardly", "downwardly", "underlying" and the like as used herein are purely illustrative, are used solely for convenience of illustration and are not deemed to be a limitation on the invention unless a clear express indication to the contrary is provided.

As the controls employed with the printer of this invention may be of a conventional type and will be obvious to those skilled in the art, detailed disclosure thereof herein is not deemed necessary.

Whereas particular embodiments of the invention have been described above for purposes of illustration, it will be evident for those skilled in the art that numerous variations of the details may be made without departing from the invention as defined in the appended claims.

We claim:

1. A photographic film printer comprising:
a housing,
a lamphouse having light source for providing a light beam for film printing,
negative handling means for supporting a strip of negatives in printing position,
filter means disposed generally between said light source and said negative handling means for moving a predetermined filter into and out of said light beam,
paper handling means for positioning photographic print paper in spaced relationship with respect to said negative handling means,
lens means for focusing light which may pass through said negatives on said photographic print paper, and
movable reflex mirror means for permitting viewing of said negative strip directly on said mirror without requiring projection of the image contained on said negative strip.

2. The photographic film printer of claim 1 including said negative handling means having a negative carrier plate for supporting said negative strip.

3. The photographic film printer of claim 2 including said negative handling means having a negative pressure plate adapted to be moved into contacting position with respect to said negative strip and to apply pressure to said strip to clamp said strip between said negative carrier plate and said negative pressure plate.

4. The photographic film printer of claim 1 including said housing having a viewing window disposed within the upper one-half thereof, and mirror means disposed within said housing adjacent to said opening.

5. The photographic film printer of claim 4 including said mirror means having a mirror adapted to assume a first position wherein a negative strip can be viewed through said window and a second position closer to said viewer window than said first position to at least partially resist entry of light through said window during printing.

6. The photographic film printer of claim 5 including power means for moving said mirror between said first position and said second position.

7. The photographic film printer of claim 6 wherein said power means includes solenoid means.

8. The photographic film printer of claim 7 including linkage means connecting said mirror and said negative pressure plate, and said linkage means adapted to cause said negative pressure plate to apply pressure to said negative strip when said viewing mirror is in said second position.

9. The photographic film printer of claim 8 including first hinge means connecting said viewing mirror to said housing, and second hinge means connecting said negative pressure plate to said housing.

10. The photographic film printer of claim 9 including aperture means formed within said negative pressure plate for permitting said light beam to pass therethrough.

11. The photographic film printer of claim 10 including said linkage means having pin and slot connections to said viewing mirror and to said negative pressure plate.

12. The photographic film printer of claim 1 wherein negative strip supporting reels are disposed on opposite sides of said reflex viewer mirror, and negative splicing means are disposed adjacent one of said reels.

13. The photographic film printer of claim 12 including said splicing means has support surfaces for supporting the negative strips which are to be spliced, film cutter means for trimming edges of strip to be joined, film guide means for aligning the two strips to be joined, and tape dispenser means for facilitating securement of the two negative strips.

14. The photographic film printer of claim 13 including said splicing means being disposed exteriorly of said housing.

15. The photographic film printer of claim 2 including a lens plate supporting said lens means disposed between said negative carrier plate and said paper handling means, and movable shutter means interposed between said lens plate and said paper handling means for cyclically resisting exposure of said paper to undesired light during periods when printing is not being effected and for permitting exposure when printing is desired.

16. The photographic film printer of claim 15 including power means for moving said shutter between said two positions.

17. The photographic film printer of claim 16 including said power means for moving said shutter including solenoid means, and linkage means connecting said solenoid means with said shutter.

18. The photographic film printer of claim 17 including said paper handling means including a paper supply reel, a paper take-up reel and power means for driving said take-up reel.

19. The photographic film printer of claim 18 including paper guide means through which said paper passes for positioning said paper in desired printing relationship with respect to said negative strip.

20. The photographic film printer of claim 19 including means for measuring the length of paper which has advanced during operation of said paper advancing power means.

21. The photographic film printer of claim 20 wherein said means for monitoring the extent of paper advance includes a wheel member which is freely rotatable with said paper and in contact therewith, said wheel member having a series of apertures through which an energy beam passes, and counter means for determining the extent of rotation of said wheel.

22. The photographic film printer of claim 21 including a series of paper mask means for providing exposure of a predetermined portion of said print paper, and one of said mask means adapted to be supported on said paper handling means during printing.

23. The photographic film printer of claim 22 including said paper masks being of generally rectangular configuration having a predetermined opening and each of them having exterior dimensions generally equal to the exterior dimensions fo the other said paper masks.

24. The photographic film printer of claim 20 including cutting means for cutting said print paper at a desired location.

25. The photographic film printer of claim 24 including said cutting means being manually operable from the exterior of said housing.

26. The photographic film printer of claim 3 including bellows means connecting said negative carrier plate with said lens plate for resisting undesired light entry.

27. The photographic film printer of claim 26 including said bellows means including exterior bellows means connecting said negative carrier plate with an opaque closure and interior bellows means connecting said interior opening in said negative carrier plate with said lens plate.

28. The photographic film printer of claim 12 including manually operable means for advancing said negative strip on one said reel.

29. The photographic film printer of claim 28 including said manually operable means including a manually rotatable knob, a connecting shaft, first gear means for effecting rotation of said connecting shaft responsive to rotation of said rotatable knob, spindle means fixedly secured to said take-up reel, second gear means for effecting rotation of said spindle means responsive to rotation of said connecting shaft.

30. The photographic film printer of claim 29 including said connecting shaft having at least two axially adjustable sections, whereby said take-up reel is operated by said manually rotatable knob even though the distances therebetween have been altered.

31. The photographic film printer of claim 30 including said connecting shaft having a tubular portion which is adapted to receive a second shaft portion,
said tubular portion having a generally axially oriented elongated slot, and
said second portion having a generally radially projecting pin member received within said slot for sliding movement therewithin.

* * * * *